UNITED STATES PATENT OFFICE.

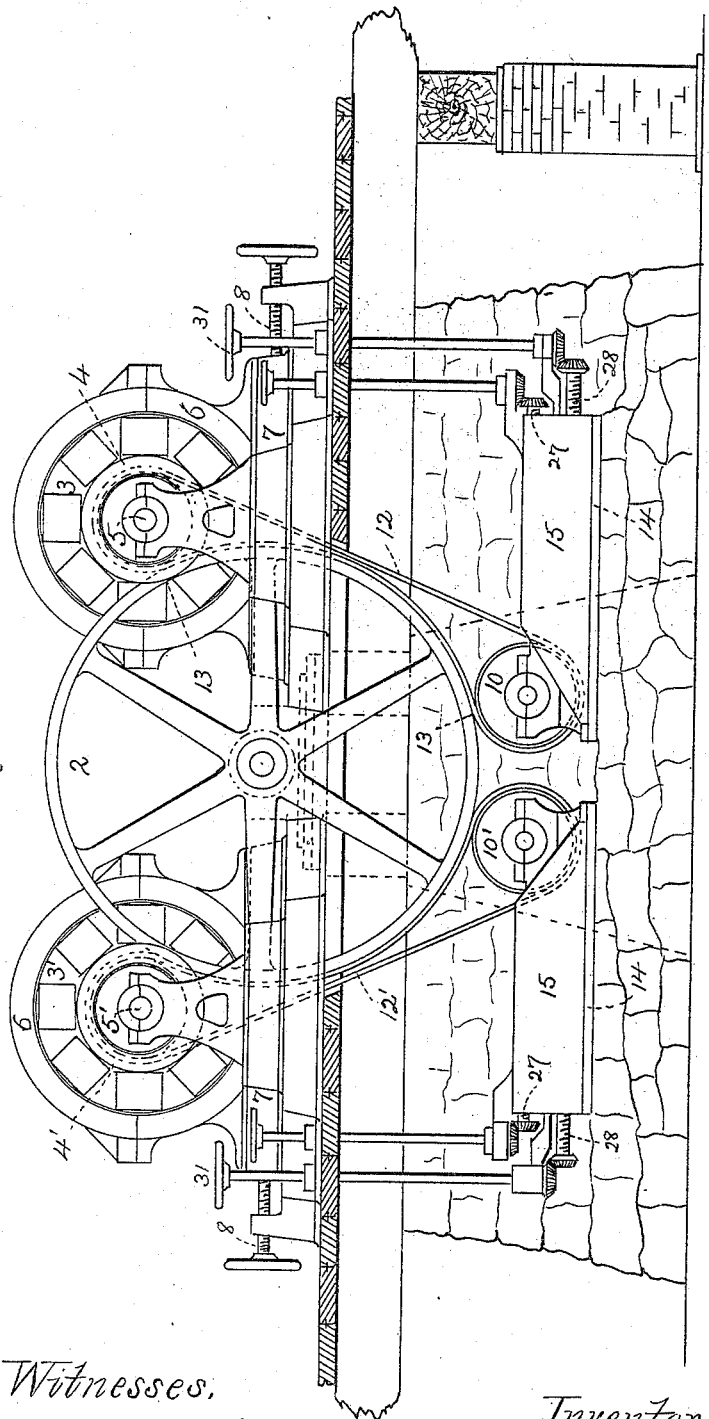

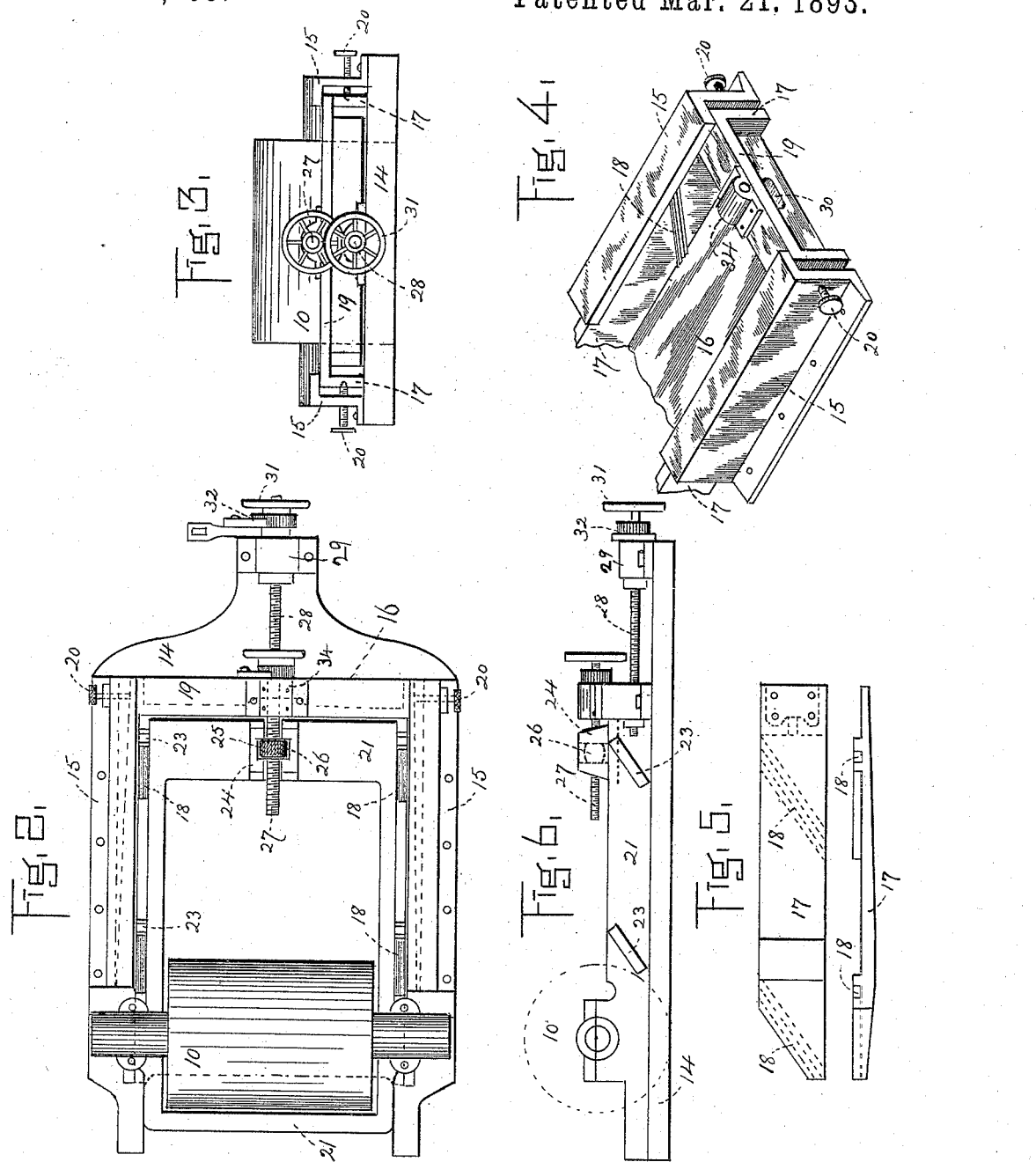

GEORGE F. EVANS, OF SOMERVILLE, MASSACHUSETTS.

MECHANISM FOR TRANSMITTING MOTION.

SPECIFICATION forming part of Letters Patent No. 493,859, dated March 21, 1893.

Application filed April 28, 1892. Serial No. 430,957. (No model.)

*To all whom it may concern:*

Be it known that I, GEORGE F. EVANS, a citizen of the United States, residing at Somerville, in the county of Middlesex and State of Massachusetts, have invented certain new and useful Improvements in Mechanism for Transmitting Motion; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to mechanism for transmitting motion particularly that class wherein two pulleys, non-contiguous, are adapted to grip and pass between them an endless belt or belts which encircle one of said pulleys. In this arrangement the belt, usually loose about one of the co-operating pulleys, is under compression in lieu of tension as ordinarily occurs with belt transmission.

In my improvements I propose to combine the above principle with surface friction; to this end I employ two pulleys which are to be non-contiguous with a third or driving pulley. Said driven pulleys are to be inclosed by a belt and are to bear against the periphery of the driving pulley at two points, termed tangent points, and so grip the belt, while the arc of the periphery between the bearing or tangent points of the driven pulleys is to receive that portion of belt which by its frictional contact with the driving pulley serves to increase the resultant power obtained by the grip exerted by the driver and driven pulleys on the band passing between them.

The drawings represent in Figure 1 a side elevation of mechanism for transmitting power embodying my invention. Fig. 2. is a plan of the adjusting device for one of the driven pulleys. Fig. 3 is an end view of the adjusting mechanism. Fig. 4 is a perspective view in part of the guides and rocking standard to receive the movable carriage. Fig. 5 shows side and edge views of the carriage guides. Fig. 6 is a side view of the carriage with adjusting mechanism; the sides of the rocking standard being omitted.

In said drawings, 2 represents a pulley termed the driver, actuated by some prime motor. Said pulley is suitably mounted and adapted in the present instance to operate two electric generators 3. 3'. These latter are supplied with pulleys 4. 4' on the armature shafts 5. 5' while the armature and field 6 are fastened to a standard 7 movable by actuating screws 8 in such a manner as to cause the pulleys 4. 4' termed the driven pulleys to approach or recede from the driver. When it is desired to actuate the generators the pulleys are caused to bear against the periphery of the driver with sufficient force to grip an endless band 12 or 12' and thus motion is imparted to the armature shafts.

Since the various parts composing my invention and arranged on each side of the driver 2 are duplicates of one another I shall for brevity of description mention and allude to but one set; the corresponding parts being characterized by similar figures.

In order to increase the power transmitted and in connection with the driven pulley 4 on the armature shaft 5, I have provided a second or auxiliary pulley 10 which is likewise adapted to be forcibly thrust against the driver or removed therefrom by mechanism hereinafter fully described. About said driven pulleys 4. 10 is placed a belt or band 12, or a series of bands [not shown], while the bearing points of the said pulleys are such with respect to the driven pulley 2, that that portion of the belt between the points of pressure 13 13 is brought in contact with the face of the pulley 2 and lies snugly thereagainst, under tension. By this frictional contact, the effect of the driver upon the two driven pulleys is increased and the power obtained through the action of the auxiliary 10 is transferred to the driven pulley 4 with increased effect. The pulleys 4' 10' with the belt 12' act in a similar manner and co-operate with the other corresponding parts to increase the power transmitted.

In the above described arrangement it is evident that compensating mechanism must be furnished to provide for the stretching of the belt, as likewise to enable the two pulleys to be advanced or withdrawn as circumstances require the rotation of the generator or any other machine to which movement is to be imparted.

As before mentioned the pulley 4 is controlled by the screw 8, but its position with respect to the face of the main driving pulley 2 is always constant. On the other hand the position of the auxiliary driven pulley 10 varies somewhat according to the length of belt, and consequently must be raised or lowered, advanced or withdrawn in order to have it grip the driver properly at all times. To provide for horizontal and vertical adjustment of this pulley I have fastened to the floor or foundation a metallic bed piece 14; to the latter are bolted two lateral vertical guides 15. These guides serve to retain a rocking standard 16 composed of two vertical sides 17 fitted with oblique slots or guide ways 18, while an end piece or strap 19 unites their rear ends. This standard is a tapered one and smallest at the rear end see Figs. 2 and 5 where it is controlled by adjusting screws 20. By movement of the latter horizontal oscillations are imparted to the rear end for purposes to be explained. Within and movably connected to said standard 16 is placed a carriage 21 which serves as a journal support for the pulley 10, see Fig. 6. Said carriage is equipped with inclined external side lips or lugs 23 which are to engage in the guide ways; the front end has a journal bearing and the rear end is fitted with a boss 24 slotted vertically at 25 to receive a nut 26 moving upon a screw threaded rod 27 the latter being journaled in a bracket 34 on the rear end of the rocking standard. An adjusting screw rod 28 journaled at 29 on the bed piece is secured to the rear end of the rocking standard furnished with a slot at 30 to allow of oscillation without disturbing the efficiency of said rod.

The combined effect of the above instrumentalities are as follows: Assuming that the pulley 4 has been advanced and bears firmly against the driver thereby gripping the belt between them, the auxiliary pulley 10 is now to be put in active communication with the main pulley 2. The hand-wheel 31, see Fig. 2, rotates the rod 28 and thrusts the standard 16 in right lines inward beneath the pulley 2 until the proper tension has been put on the belt drawing it from the fixed point 13, while a pawl and ratchet 32 hold it in one position. When this is effected, the screw rod 27 is actuated and the carriage 21 is compelled to rise or fall in horizontal planes by movement of the lugs 23 in the inclined guide ways 18. By this adjustment the pulley 10 is raised or lowered, that is, its position is varied according to the tension desired on the belt. To compensate for the rise and fall of the carriage, since the latter is actuated by means of the screw rod 27, which is mounted on the rear end of the standard, the boss 24 as before stated is vertically slotted, hence the nut, which engages therein, is free to move as the rise or fall of the carriage occurs. To control the belt and maintain it in proper position on the face of the driver the oscillating movement of the standard 16 is provided for and regulated by the screws 20. Since the two pulleys are held forcibly against the face of the driver the tension on the belt between said points may be increased or diminished to any extent. In Fig. 2 the adjusting screw rods 27 and 28 are actuated by hand-wheels, while in Fig. 1, I have shown them fitted with miter gears adapted to mesh with corresponding ones on vertical rods. This is very desirable where the main wheel is in a pit or partially below the floor surface as frequently happens.

With the above described mechanism I have a very powerful and efficient device for transmitting motion. It is very compact, since the driven shaft is in immediate proximity to the main shaft, no long belts are required, while the driven shaft can be stopped or started without reference to other shafts operated by the driver. The addition of the auxiliary pulley and the belt inclosing both driven pulleys is a ready expedient for increasing the power transmitted to the driven shaft with its mechanism, since the resultant effect from the grip of both driven pulleys is obtained, while owing to the proximity of the belt to the driver between the points of pressure that portion is put under tension, and effects due to frictional belt transmission likewise availed of.

What I claim is—

1. In combination with a rotary driving pulley, a revoluble driven pulley upon a countershaft adjustable with respect to the main shaft, an auxiliary pulley adjustable both vertically and horizontally with respect to the driving pulley, a belt which encircles both driven pulleys and passing between them and the driving pulley, and adapted to be gripped thereby, together with mechanism for adjusting the position of the auxiliary pulley, substantially as specified.

2. The combination with a continuously rotary driving pulley, an adjustable driven pulley, a band which encircles said driven pulley and to be gripped between the two, of an auxiliary driven pulley likewise encircled by the band and adapted to co-operate with the driving pulley to grip said band, together with mechanism for adjusting said auxiliary pulley, composed of a stationary bed-plate, a rocking standard thereon for horizontal movement, a journal carriage for vertical movement, together with mechanism for actuating the several elements and holding them as desired, substantially as stated.

3. In mechanism for transmitting motion, a rotary driving pulley, a driven pulley adjustably mounted with respect thereto and adapted to grip with said driving pulley an endless band, combined with an auxiliary driven pulley, the endless band adapted to encircle both driven pulleys and be gripped at the tangent points of said pulleys with said driving pulley, together with mechanism for controlling the position of the auxiliary driven pulley, composed of a stationary bed-plate 14 the screw-actuated standard tapered at its rear end, and oscillated by screws 20, the inclined guide ways 18, a journal carriage mounted in said guide ways, the screw rod with its nut for causing the rise and fall of said carriage, and a slotted boss 24 on the standard, to allow movement of the nut 26, substantially as and for the purposes specified.

In testimony whereof I affix my signature in presence of two witnesses.

GEORGE F. EVANS.

Witnesses:
H. E. LODGE,
FRANCIS C. STANWOOD.